United States Patent
Ekici

(10) Patent No.: US 9,867,229 B2
(45) Date of Patent: Jan. 9, 2018

(54) METHOD AND APPARATUS TO CONTROL HSDPA ACTIVATION/DE-ACTIVATION

(71) Applicant: BlackBerry Limited, Waterloo (CA)

(72) Inventor: Ozgur Ekici, Escondido, CA (US)

(73) Assignee: BlackBerry Limited, Waterloo (CA)

( * ) Notice: Subject to any disclaimer, the term of this patent is extended or adjusted under 35 U.S.C. 154(b) by 153 days.

(21) Appl. No.: 14/750,544

(22) Filed: Jun. 25, 2015

(65) Prior Publication Data

US 2016/0174291 A1 Jun. 16, 2016

Related U.S. Application Data

(63) Continuation of application No. 13/206,695, filed on Aug. 10, 2011, now Pat. No. 9,072,099.

(51) Int. Cl.
| | |
|---|---|
| *H04W 76/06* | (2009.01) |
| *H04W 36/18* | (2009.01) |
| *H04W 36/08* | (2009.01) |

(52) U.S. Cl.
CPC ......... *H04W 76/064* (2013.01); *H04W 36/18* (2013.01); *H04W 36/08* (2013.01)

(58) Field of Classification Search
CPC .... H04W 76/064; H04W 36/18; H04W 36/08
See application file for complete search history.

(56) References Cited

U.S. PATENT DOCUMENTS

| 7,286,563 B2 | 10/2007 | Chang et al. |
| 7,710,921 B2 | 5/2010 | Matsumoto |
| 7,965,672 B2 * | 6/2011 | Kim ............... H04W 36/22 370/327 |
| 8,369,855 B2 | 2/2013 | Yahagi |

(Continued)

FOREIGN PATENT DOCUMENTS

| CN | 1965593 A1 * | 9/2008 | ............ H04W 48/02 |
| EP | 1761097 A2 | 3/2007 | |

(Continued)

OTHER PUBLICATIONS

Canadian Intellectual Property Office, Office Action on Application No. 2783345, dated Apr. 15, 2015.

(Continued)

*Primary Examiner* — Hassan Kizou
*Assistant Examiner* — Deepa Belur
(74) *Attorney, Agent, or Firm* — Moffat & Co.

(57) ABSTRACT

A method and a user equipment ("UE"), for High Speed Downlink Packet Access ("HSDPA") de-activation, the method determining whether a number of serving HSDPA cell changes of the UE exceeds a threshold within a predetermined time period; and; sending a transition indication from the UE to a network node to deactivate HSDPA if the threshold is exceeded for within the predetermined time period. Also, a method and a network node, for High Speed Downlink Packet Access de-activation, the method determining whether a number of serving HSDPA cell changes of a user equipment communicating with the network node exceeds a threshold within a predetermined time period; and; deactivating HSDPA for the UE if the threshold is exceeded within the predetermined time period.

14 Claims, 7 Drawing Sheets

(56) References Cited

U.S. PATENT DOCUMENTS

| | | | |
|---|---|---|---|
| 2005/0128972 A1* | 6/2005 | Kim | H04W 24/02 370/328 |
| 2006/0146750 A1 | 7/2006 | Chen | |
| 2007/0049308 A1 | 3/2007 | Lindoff et al. | |
| 2009/0052401 A1 | 2/2009 | Nakajima | |
| 2009/0075666 A1 | 3/2009 | Makhijani et al. | |
| 2009/0161688 A1* | 6/2009 | Park | H04W 48/08 370/441 |
| 2009/0196259 A1 | 8/2009 | Pani et al. | |
| 2010/0034176 A1 | 2/2010 | Heo et al. | |
| 2010/0039968 A1 | 2/2010 | Papageorgiou | |
| 2010/0067481 A1 | 3/2010 | Maeda | |
| 2010/0202393 A1* | 8/2010 | Zhang | H04L 5/0007 370/329 |
| 2010/0220687 A1 | 9/2010 | Reznik et al. | |
| 2010/0246479 A1 | 9/2010 | Deu-Ngoc et al. | |
| 2010/0278341 A1* | 11/2010 | Kubota | H04W 12/02 380/257 |
| 2011/0019629 A1* | 1/2011 | De Pasquale | H04B 7/0413 370/329 |
| 2011/0026422 A1 | 2/2011 | Ma et al. | |
| 2011/0134774 A1 | 6/2011 | Pelletier et al. | |
| 2011/0170420 A1 | 7/2011 | Xi et al. | |
| 2012/0076021 A1 | 3/2012 | Sambhwani | |
| 2012/0163338 A1* | 6/2012 | Zhang | H04W 36/0083 370/331 |
| 2012/0207133 A1 | 8/2012 | Wong | |
| 2012/0281544 A1 | 11/2012 | Anepu et al. | |
| 2013/0028234 A1 | 1/2013 | DiGirolamo et al. | |
| 2013/0070609 A1* | 3/2013 | Hultell | H04L 5/06 370/241 |

FOREIGN PATENT DOCUMENTS

| | | |
|---|---|---|
| WO | 2006126461 A1 | 11/2006 |
| WO | 2006137779 A1 | 12/2006 |

OTHER PUBLICATIONS

Canadian Intellectual Property Office, Office Action on Canadian Application No. 2,783,345 dated May 20, 2014.

EP Application No. 11177133.3, Extended European Search Report, dated Jan. 3, 2012.

The Impact of Background Network Traffic on Foreground Network Traffic; George Nychis, Information Networking Institute and Daniel R. Licata, Computer Science Department, Carnegie Mellon University, 2001.

3GPP TS 25.331 v8.13.0 3GPP Technical Specification Group Radio Access Network; Radio Resource Control (RRC); Protocol specification (Release 8), Dec. 2010.

European Patent Office, Office Action on Application No. 11177133.3, dated Jul. 2, 2015.

* cited by examiner

METHOD AND APPARATUS TO CONTROL HSDPA ACTIVATION/DE-ACTIVATION

FIELD OF THE DISCLOSURE

The present disclosure relates to High Speed Downlink Packet Access (HSDPA) operation, and in particular, the present disclosure relates to the activation and deactivation of HSDPA operation in a given wireless network configuration.

BACKGROUND

HSDPA mode of operation, where the users utilize shared network resources, allows mobile devices to receive data at a higher rate than what is achievable utilizing dedicated channels (DCH) in Universal Mobile Telecommunications Service (UMTS) systems. This higher data rate is achieved, in part, by buffering and re-transmitting (if needed) data intended for a mobile device at a Node B of the serving cell, which is physically closer to the end user. Conversely, in dedicated channel mode of operation in a legacy network such as R99 (Frequency Division Duplexing [FDD] systems such as Wideband Code Division Multiple Access [WCDMA]) or R4 (Time Division Duplexing [TDD] systems such as Time Division Synchronous Code Division Multiple Access [TD-SCDMA]), the buffering of data intended for a mobile device is performed at the Radio Network Controller (RNC).

While HSDPA reduces latency and improves throughput performance by moving data re-transmission operations at the Node-B closer to the mobile user, the buffering of data at the Node B causes data loss during handover operations involving serving HSDPA cell change. Specifically, as a mobile device switches from a serving Node B (source) to another (target) Node-B, any data buffered at the source Node B is lost, and must be re-transmitted from the RNC to the target Node B. Moreover, hybrid automatic repeat request (HARQ) entities at the source Node B are deleted, and re-established at the target Node B. In HSDPA mode of operation the cell providing HSDPA services is called the "serving HSDPA cell". HSDPA operation does not support soft-handover where the UE receives data from multiple cells simultaneously. Therefore at any one time, there is only one serving HSDPA cell for a given UE. When the network sees the need to change the serving HSDPA cell (taking into account UE measurements of neighbouring and serving cells), the network has to cease and delete all HSDPA related parameters (buffers, HARQ queues) at the source cell and move these entities to the target HSDPA serving cell if it wants to continue HSDPA mode of operation.

These issues can increase latency and decrease throughput performance significantly, and particularly when a mobile device performs frequent handovers of the serving HSDPA cell, such as a mobile device moving at high speed, or a mobile device roaming around Node B boundaries.

BRIEF DESCRIPTION OF THE DRAWINGS

The present disclosure will be better understood with reference to the drawings in which.

DETAILED DESCRIPTION

Figure 1:
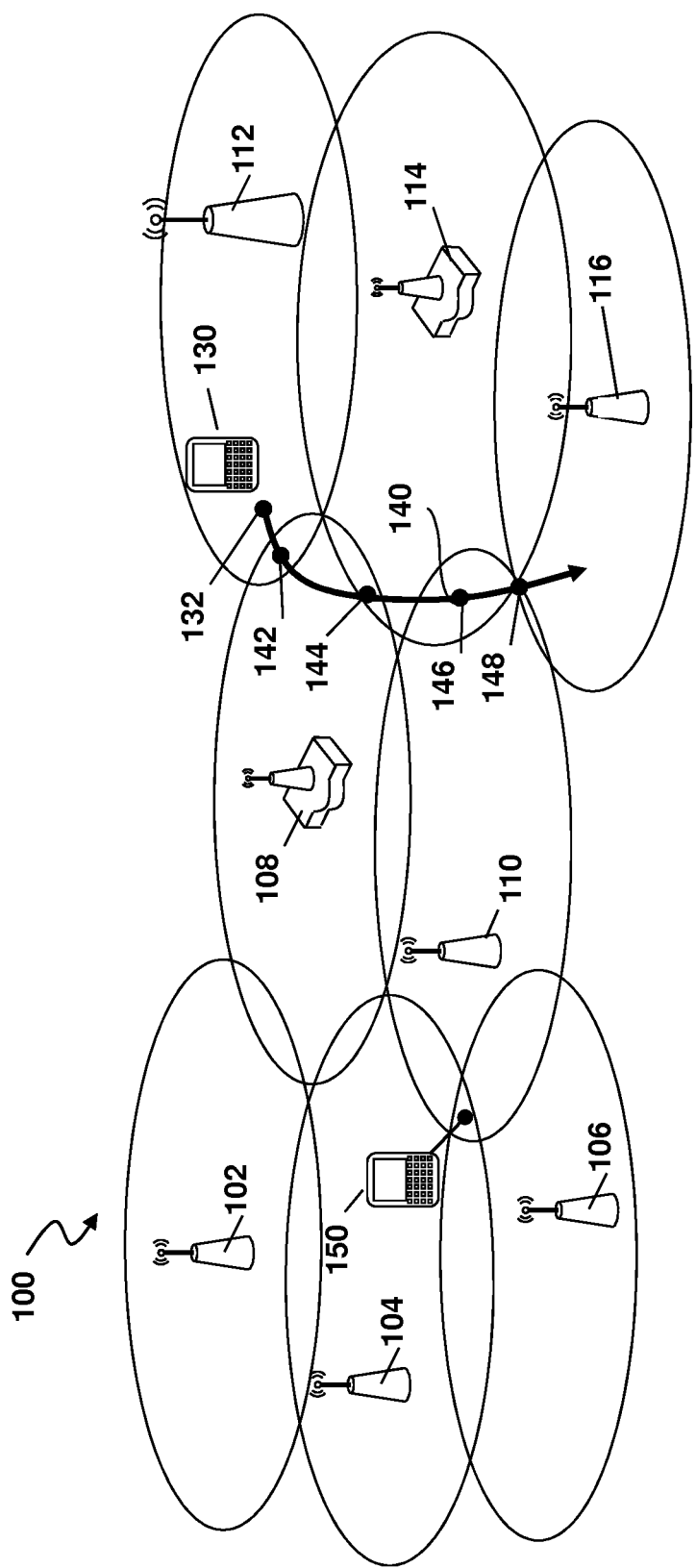
FIG. 1 is a simplified schematic diagram of a portion of a cellular network in which an embodiment of the present disclosure may be practiced.

According to one aspect of the present disclosure, there is provided a method, at a user equipment ("UE"), for High Speed Downlink Packet Access ("HSDPA") de-activation, comprising: determining whether a number of serving HSDPA cell changes of the UE exceeds a threshold within a predetermined time period; and; sending a transition indication from the UE to a network node to deactivate HSDPA if the threshold is exceeded within the predetermined time period.

According to another aspect of the present disclosure, there is provided a method, at a network node, for High Speed Downlink Packet Access ("HSDPA") de-activation, comprising:determining whether a number of serving HSDPA cell changes of a user equipment ("UE")communicating with the network node exceeds a threshold within a predetermined time period; and; deactivating HSDPA for the UE if the threshold is exceeded within the predetermined time period.

According to yet another aspect of the present disclosure, there is provided a user equipment (UE) adapted for High Speed Downlink Packet Access (HSDPA) activation and de-activation comprising: a communication subsystem; a processor; wherein the communication subsystem and the processor cooperate to: determine whether a number of serving HSDPA cell changes of the UE exceeds a threshold within a predetermined time period; and; send a transition indication from the UE to a network node to deactivate HSDPA if the threshold is exceeded within the predetermined time period.

According to another aspect of the present disclosure, there is provided a network element adapted for High Speed Downlink Packet Access (HSDPA) activation and de-activation, the network element being configured to: determining whether a number of serving HSDPA cell changes of a user equipment ("UE") communicating with the network node exceeds a threshold within a predetermined time period; and; deactivate HSDPA for the UE if the threshold is exceeded within the predetermined time period.

The present disclosure is described below with regards to various embodiments described herein. Such embodiments are not intended to be limiting and could be modified by those skilled in the art and still be within the scope of the present disclosure.

The present disclosure is directed to improving network performance for user equipments (UEs) which frequently change HSDPA serving cells. As used herein, a UE could be any mobile device, including, but not limited to, a data enabled cellular phone, a personal digital assistant, a laptop, a mobile station, among others.

Generally, a user equipment communicates with a Node B associated with a cell in which the UE is located. When the UE moves to an area that is not served by the Node B, a handover procedure is initiated. As discussed above, during HSDPA mode of operation, when a handover procedure occurs while the serving Node B has data buffered for the UE, a loss of performance ensues.

Specifically, the performance drop caused by a change in the serving HSDPA cell change can span from 5 to 20 seconds, depending on network loading and configuration. Using DCH mode of operation in response to frequent HSDPA serving cell changes bypasses deletion and re-establishment of HARQ processes and transfer of buffered data from one Node-B to another, circumventing additional jitter and latency to data transmission, thus improving user experience, especially for streaming services.

FIG. 1 illustrates different scenarios where a UE might frequently change cells, resulting in frequent serving HSDPA cell change procedures. In FIG. 1, a cellular network 100, having cells 102, 104, 106, 108, 110, 112, 114 and 116 are shown. For the purposes of this example, it will be assumed that each of the cells 102-116 is served by a distinct Node B (not shown).

In one example, a UE 130 is located at a point 132, in cell 112, and travels to cell 116 via path 140. As can be seen from FIG. 1, the UE will cross cell boundaries and perform handovers at points 142, 144, 146, and 148. Assuming the UE is traveling at high speeds, for example if the UE is traveling in an automobile, the UE will have performed 4 handover procedures involving serving HSDPA cell change in a relatively short period of time.

In another example, a UE 150 is located in a boundary area between cells 104, 106 and 110. Accordingly, even if the UE does not move very much or at high speeds, the UE may perform several handover procedures involving serving HSDPA cell change in a short period of time due to changing network conditions and the proximity to cell boundaries.

Because data is lost and HARQ processes are reset during each serving HSDPA cell change, the data performance of UE 130 or 150 may be worse in HSDPA mode of operation compared to legacy DCH mode of operation where the UE is allocated dedicated resources. The present disclosure provides methods for improving data performance for such UEs that frequently perform serving HSDPA cell change. The methods may be performed at the UE or may be performed a network element such as a Radio Network Controller (RNC).

UE Determination

In one set of embodiments, the UE may make the determination that it is performing frequent serving HSDPA cell changes due to either moving quickly or being in a boundary region, and thus that the UE would prefer to be in a DCH mode of operation rather than in HSDPA mode of operation.

In one embodiment, the UE may rely on network signaling to identify itself as a UE which performs frequent serving HSDPA cell changes. For example, a UE may monitor the number of times it receives a MAC-hs reset indication within a period of time. In one example, if the UE receives 4 MAC-hs reset indications in 60 seconds, the UE is identified as a UE which performs frequent serving HSDPA cell changes. However, this example is not intended to be limiting and other means of determining that a UE performs frequent serving HSDPA cell changes based on network signaling is within the scope of the present disclosure.

Figure 2:
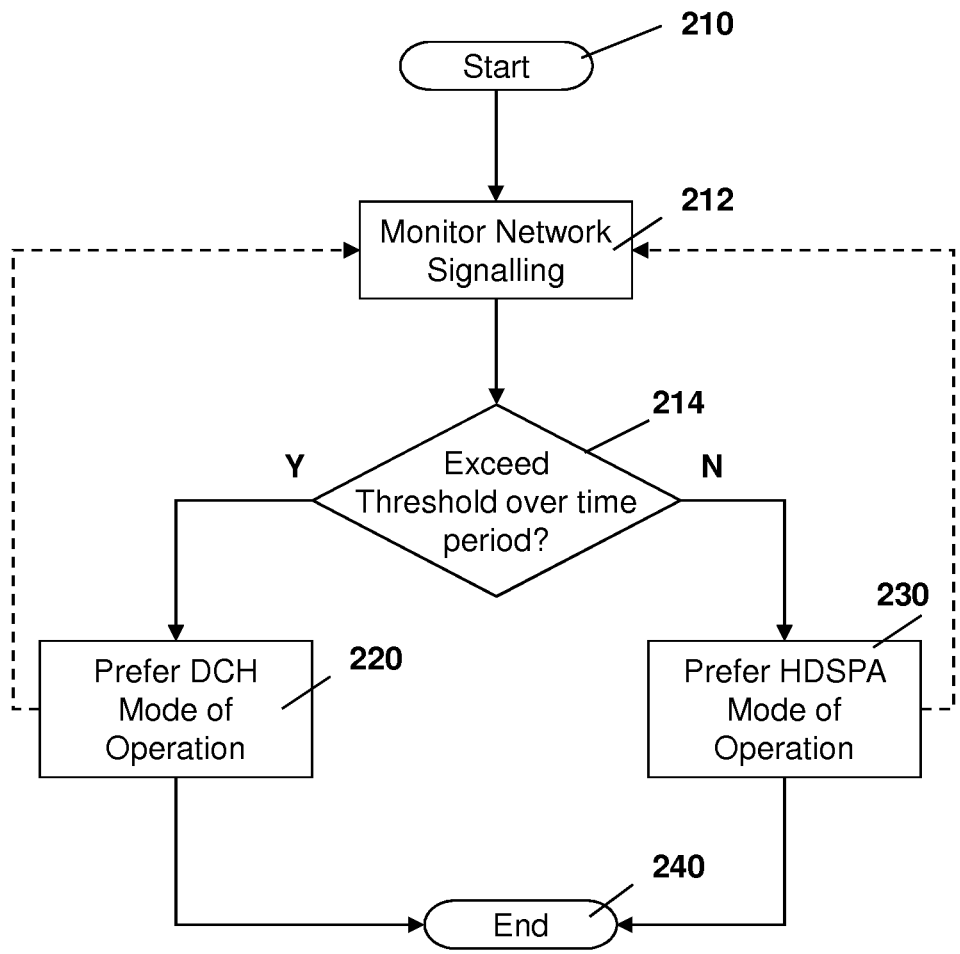
FIG. 2 is a process diagram to determine whether a user equipment (UE) should prefer HSDPA mode of operation or not, taking into account serving HSDPA cell change frequency.

The above embodiments are illustrated with regard to FIG. 2. In FIG. 2, the process starts at block 210 and proceeds to block 212 in which the UE monitors network signaling. As indicated above, the network signaling might be MAC-hs reset indications, among others.

From block 212 the process proceeds to block 214 and determines whether the number of network signals monitored in block 212 has exceeded a threshold within a time period. For example, 4 MAC-hs reset indications within 60 seconds might cause the threshold to be exceeded. However, this is not limiting and the messages monitored, threshold and time period may be configured at the device at the time of manufacturing or dynamically by a carrier, network administrator or user of the UE.

From block 214, if the threshold is exceeded for the time period, the process proceeds to block 220 in which the UE switches to use the DCH mode of operation. Conversely, if the threshold is not exceeded, the process proceeds to block 230 in which the UE prefers to remain in the HDSPA mode of operation.

From block 220 or 230 the process proceeds to block 240 and ends. In alternative embodiments the process may proceed from blocks 220 or 230 back to block 212 to continue to determine which type of network the UE prefers. In various embodiments, if the UE is in DCH mode of operation the threshold at block 212 may be different from the threshold if the UE is in an HSDPA mode of operation.

Network Determination

The determination of whether a UE performs frequent serving HSDPA cell changes may be made at the network side rather than on the UE side.

In at least one embodiment, the RNC monitors how many serving HSDPA cell changes have occurred for each of the UEs it is currently serving. If a UE has experienced more serving HSDPA cell changes than a threshold in a given time period, the UE is determined to be a UE which performs frequent serving HSDPA cell changes. The value of the threshold and the length of the time period may be predetermined or selected by a carrier or network operator, for example.

For example, a time log from a commercial network might show the messages of Table 1.

TABLE 1

Serving Node-B relocation message sequence

| Index | Time | RRC message | Notes |
|---|---|---|---|
| 1 | 23:21:07.828 | measurementReport | Change of best frequency |
| 2 | 23:21:08.609 | physicalChannelReconfiguration | Mac-hsResetIndicator :: true |
| 3 | 23:21:22.46 | measurementReport | Change of best frequency |
| 4 | 23:21:22.656 | physicalChannelReconfiguration | Mac-hsResetIndicator :: true |
| 5 | 23:21:41.109 | measurementReport | Change of best frequency |
| 6 | 23:21:41.734 | physicalChannelReconfiguration | Mac-hsResetIndicator :: true |

TABLE 1-continued

Serving Node-B relocation message sequence

| Index | Time | RRC message | Notes |
|---|---|---|---|
| 7 | 23:22:17.906 | measurementReport | Change of best frequency |
| 8 | 23:22:18.546 | physicalChannelReconfiguration | Mac-hsResetIndicator :: true |
| 9 | 23:22:21.265 | measurementReport | Change of best frequency |
| 10 | 23:22:21.968 | physicalChannelReconfiguration | Mac-hsResetIndicator :: true |

Table 1 shows 5 consecutive mac-hs-reset operations in around 70 seconds, which would cause HSDPA data performance to be lower than if the UE was connected to via DCH mode of operation.

In at least another embodiment, the RNC or another network element may determine that a UE performs frequent serving HSDPA cell changes by observing radio resource control (RRC) messages the network sent on the downlink to the UE. An example RRC message the RNC sends on the downlink to the UE is physicalChannelReconfiguration message with the setting Mac-hsResetIndicator set to TRUE.

Figure 3:
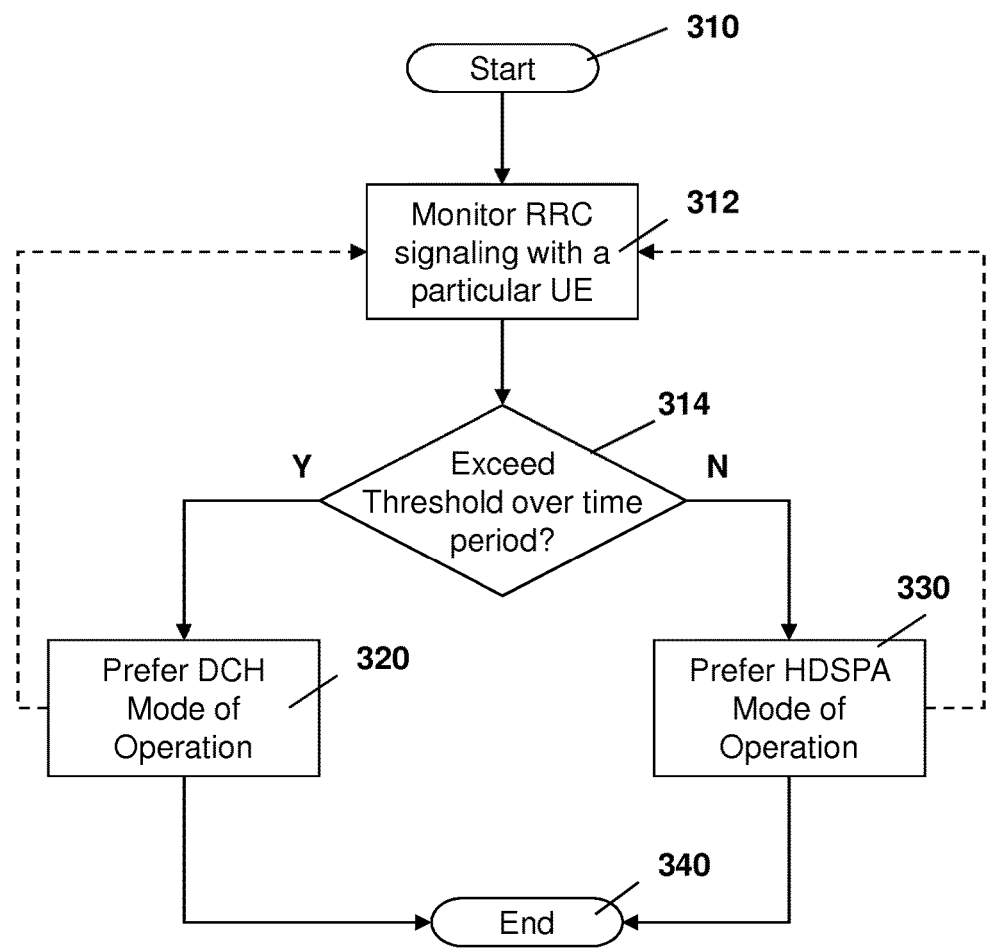
FIG. 3 is a process diagram for determining, from a network perspective, whether a UE should be transitioned to DCH mode of operation or not.

The above embodiments are illustrated with regard to FIG. 3. In FIG. 3, the process starts at block 310 and proceeds to block 312 in which the network monitors its own RRC signaling with a particular UE. As indicated above, the network signaling might be MAC-hs reset indications, among others.

From block 312 the process proceeds to block 314 and determines whether the number of signals monitored in block 312 has exceeded a threshold within a time period. For example, 4 MAC-hs reset indications sent by the network within 60 seconds might cause the threshold to be exceeded. However, this is not limiting and the messages monitored, threshold and time period may be configured at the network.

From block 314, if the threshold is exceeded for the time period, the process proceeds to block 320 in which the network may prefer the UE to use the DCH mode of operation for data connectivity. Conversely, if the threshold is not exceeded, the process proceeds to block 330 in which the network prefers the UE to remain in the HDSPA mode of operation.

From block 320 or 330 the process proceeds to block 340 and ends. In alternative embodiments the process may proceed from blocks 320 or 330 back to block 312.

The above procedures for determining that a UE frequently performs serving HSDPA cell changes are provided for illustrative purposes only, and the present disclosure is not limited to the above mentioned procedures.

Once it has been determined that the UE performs frequent serving HSDPA cell changes, either by the UE itself or by the network, in accordance with the present disclosure, the HSDPA mode of operation of the UE is disabled, so as to avoid the performance issues which occur in HSDPA connections on a UE which performs frequent serving HSDPA cell changes.

In the case where the UE has identified itself as frequently performing serving HSDPA cell changes, the UE may initiate the RRC procedure to disable HSDPA capability on the fly (during the connection). Similarly, when the network has determined that the UE performs frequent serving HSDPA cell changes, the network may initiate the procedure to disable HSDPA capability unilaterally.

The UE may disable its own HSDPA capability by using the Capability Update procedure, as outlined in the Third Generation Partnership Project (3GPP), Technical Specification (TS) 25.331, "Radio Resource Control, Protocol Specification", v.10.3.0, Apr. 1, 2011, the contents of which are incorporated herein by reference. Specifically, the Capability Update procedure allows a UE to signal to the Universal Terrestrial Radio Access Network (UTRAN) what its capabilities are, via a UE CAPABILITY INFORMATION message. Accordingly, the UE may disable HSDPA by signaling to the UTRAN that it does not support HSPDA.

The UTRAN, having received the UE CAPABILITY INFORMATION message from the UE indicating that the UE does not support HSDPA, will determine that bearers for the UE must be reconfigured. In this case, the UTRAN (i.e., the RNC) will reallocate resources such that the UE will no longer have HSDPA resources assigned to it. Then, the UTRAN will respond to the UE with a UE CAPABILITY INFORMATION CONFIRM message.

The UTRAN may also initiate the procedure to disable HSDPA mode of operation for a UE unilaterally. The network may simply reconfigure its data bearers and reallocate resources so that the UE no longer has HSDPA resources assigned to it.

In at least one embodiment, the UE is maintained on DCH mode of operation until it is determined that the UE is no longer performing frequent serving HSDPA cell changes. Such a determination could occur in a similar fashion to the determination that the UE was performing frequent serving HSDPA cell changes.

The UE may determine that it has stopped performing frequent serving HSDPA cell changes based on network signaling. For example, a UE may monitor the number of times it receives a MAC-hs reset indication in RRC messages within a period of time. Thus, for example, if the UE receives less than 2 RRC messages with the MAC-hs reset parameter set to TRUE in 120 seconds, the UE is identified as a UE which does not perform frequent serving HSDPA cell changes. Notably, the conditions used to determine a UE has stopped performing frequent serving HSDPA cell changes do not necessarily mirror the conditions used to determine the UE was performing frequent serving HSDPA cell changes, although they may.

Alternatively, the determination that the UE has stopped performing frequent serving HSDPA cell changes may be made by a network element by monitoring the frequency of RRC messages including a MAC-hs-reset indication, the network element sends to the UE.

In at least one embodiment, the RNC may monitor the number of cell changes for each of the UEs it is serving for which the HSDPA capability has been disabled. If such a UE has experienced fewer serving HSDPA cell changes than a given threshold within a period of time, it will be deemed to have stopped performing frequent serving HSDPA cell changes. Again, the conditions used to determine that a UE has stopped performing frequent serving HSDPA cell changes do not necessarily mirror the conditions used to determine that the UE was performing frequent serving HSDPA cell changes.

In yet another embodiment, a UE for which the HSDPA capacity has been disabled could simply maintain the HSDPA capacity disabled for a known period of time. This period of time could be a constant, or it could be received from the network, or it could be a function of network characteristics such as average cell size in the area. In at least one embodiment, this period of time is a function of serving HSDPA cell change frequency. Other network characteristics would be known by those skilled in the art having regard to the present disclosure.

The RNC may also determine that a UE may re-activate the HSDPA mode of operation for any number of reasons, such as network traffic, network load, an amount of data intended for the UE, or other reasons.

The procedure for re-activating the HSDPA mode of operation is similar to the procedure for de-activating the HSDPA mode of operation described above. For example, if the UE decides to re-activate HSDPA, the UE may send a UE CAPABILITY INFORMATION message to the UTRAN indicating that the UE supports HSDPA feature. The response by the UTRAN would be to allocate HSDPA resources for the UE and send the UE a UE CAPABILITY INFORMATION CONFIRM message.

Similarly, if the network decides to re-activate HSDPA for the UE, it may simply allocate HSDPA resources for the UE unilaterally.

Figure 4:
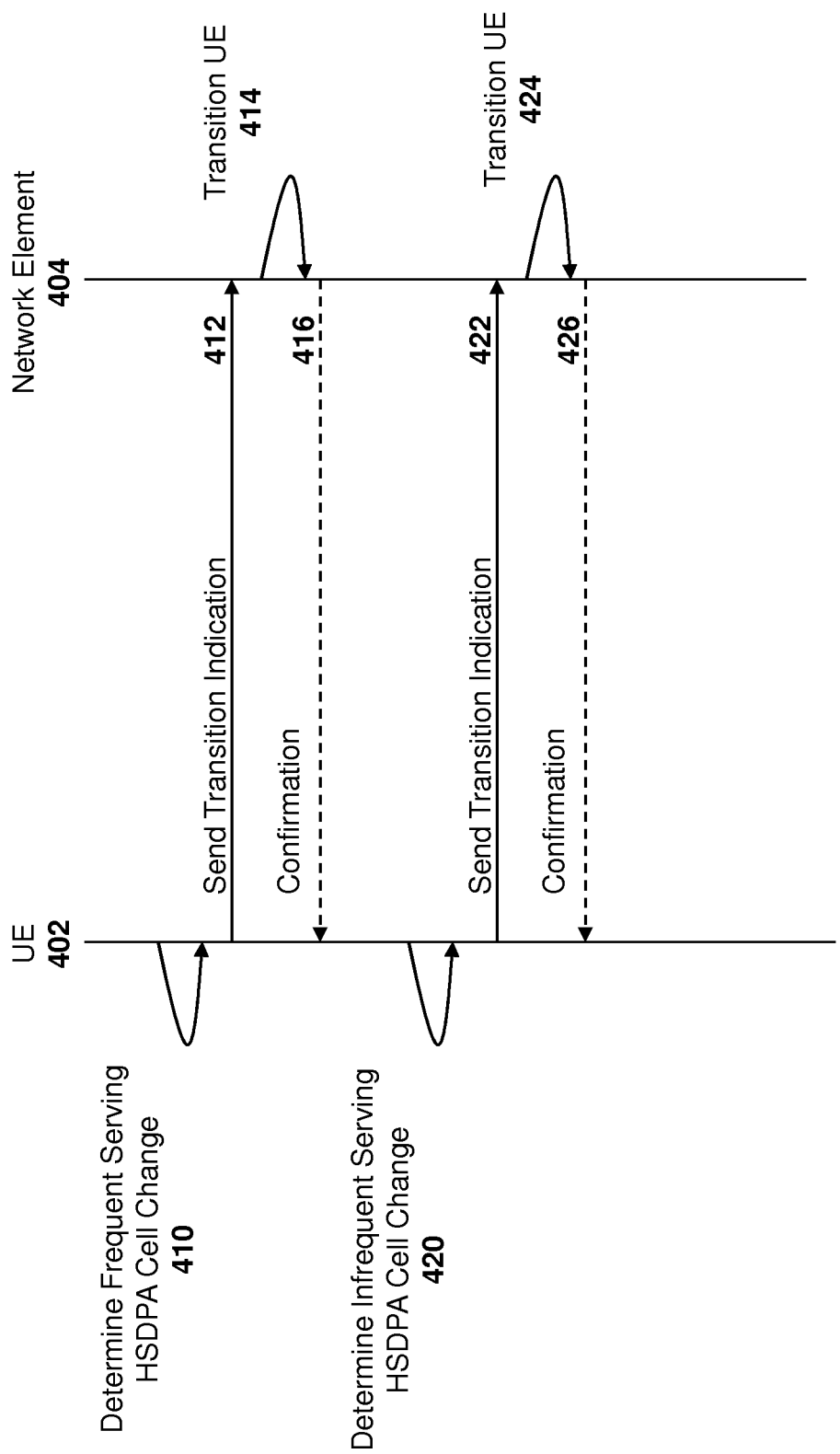
FIG. 4 is a data flow diagram showing communication between a UE and network node when the UE initiates communication mode (i.e. from DCH to HSDPA or vice-versa) transition.

Reference is now made to FIG. 4, which shows a data flow diagram of the method in which decisions to de-activate or re-activate HSDPA mode of operation are taken at the UE.

In the embodiment of FIG. 4, a UE 402 communicates with a network element 404, such as a Node B. As shown by arrow 410, the UE 402 determines that it performs frequent serving HSDPA cell changes. As discussed above, the UE 402 can do this by monitoring the number of MAC-hs reset indications received during a given time, among others.

Once UE 402 determines that it performs frequent serving HSDPA cell changes, the UE then requests the network to disable HSDPA by sending a transition message, as shown by arrow 412, to network node 404. As discussed above, the transition message may be a UE CAPABILITY INFORMATION message. However, this is not limiting and any transition message could be used, including a new dedicated transition message, which could be created or any RAT specific RRC message performing a similar operation. Further existing messages may be used to piggyback transition indications. For example, the transition message at arrow 412 should indicate that the UE does not support the HSDPA mode of operation.

The network node 404 can then transition the UE, as shown by arrow 414, and optionally respond with a confirmation message such as a UE CAPABILITY INFORMATION CONFIRM message, as shown by arrow 416.

Once HSDPA mode of operation has been disabled for the UE, the UE then determines whether it has stopped performing frequent serving HSDPA cell changes, as shown by arrow 420. In some embodiments, the check is omitted and the HSDPA mode of operation may be re-activated after some delay or based on some other factor.

If the UE 402 has stopped performing frequent serving HSDPA cell changes, the UE 402 sends the network node 404 a transition message, such as a UE CAPABILITY INFORMATION message, indicating that the UE does support the HSDPA feature, as shown by arrow 422. The network node 404 responds by allocating HSDPA resources for the UE, as shown by arrow 424, and optionally sends a confirmation, such as a UE CAPABILITY INFORMATION CONFIRM message, to UE 402, as shown by arrow 426.

Figure 5:
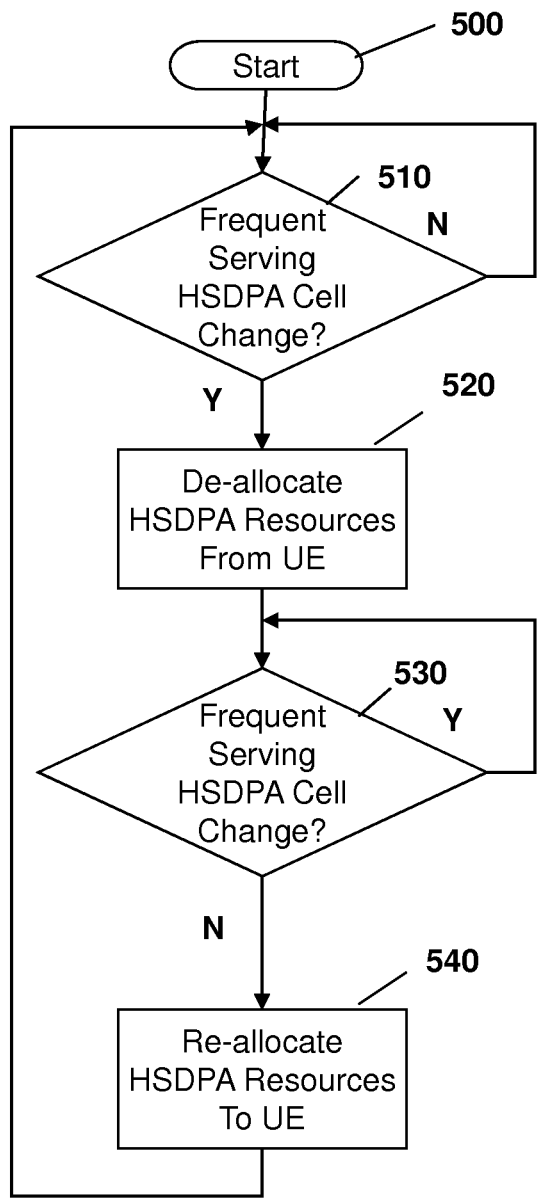
FIG. 5 is a process diagram showing a network node implemented method according to one embodiment of the present disclosure.

Reference is now made to FIG. 5, which shows a block diagram of the process in which decisions to de-activate or re-activate HSDPA mode of operation are taken at the network.

The process starts at 500 and proceeds to block 510 where the network determines whether the UE is performing frequent serving HSDPA cell changes. As discussed above, the network can do this by monitoring the number of cell changes experienced by the UE within a given time period.

If the UE does not perform frequent serving HSDPA cell changes, the process loops back to block 510. Otherwise, the process proceeds to block 520 where the network disables the HSDPA mode of operation for the UE by de-allocating HSDPA resources from the UE. Then, at block 530, the network checks whether the UE has stopped performing frequent handovers. In at least one embodiment, this step is omitted and the HSDPA mode of operation is reactivated for the UE after some delay or based on some other factor.

If the UE has not stopped performing frequent serving HSDPA cell changes, the process loops back to block 530. Otherwise, the network reactivates HSDPA for the UE by allocating HSDPA resources for the UE, as shown by block 540. The process then returns to block 510.

The present method and apparatus further provide the benefit of improving the success rate of forward error control coding. In particular, as would be appreciated by those skilled in the art, the interleaving depth for DCH mode of operation is 10 milliseconds, while the interleaving depth for HSDPA mode of operation is 2 milliseconds. When a UE is moving at high speeds, greater interleaving depth helps to spread block errors in the data, thereby increasing the efficiency of forward error control coding. As in many cases a fast moving UE will be deemed to be frequently performing handovers, the present method and apparatus provide the additional benefit of providing greater interleaving depth for fast moving UEs.

The above can be implemented on any UE and the present disclosure is not meant to be limited to any particular UE. One example of a UE on which the above could be implemented is shown below with regard to FIG. 6.

UE 600 is a two-way wireless communication device. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 600 is enabled for two-way communication, it can incorporate a communication subsystem 611, including both a receiver 612 and a transmitter 614, as well as associated components such as one or more, antenna elements 616 and 618, local oscillators (LOs) 613, and a processing module such as a digital signal processor (DSP) 620 The particular design of the communication subsystem 611 depends upon the communication network in which the device is intended to operate.

Figure 6:
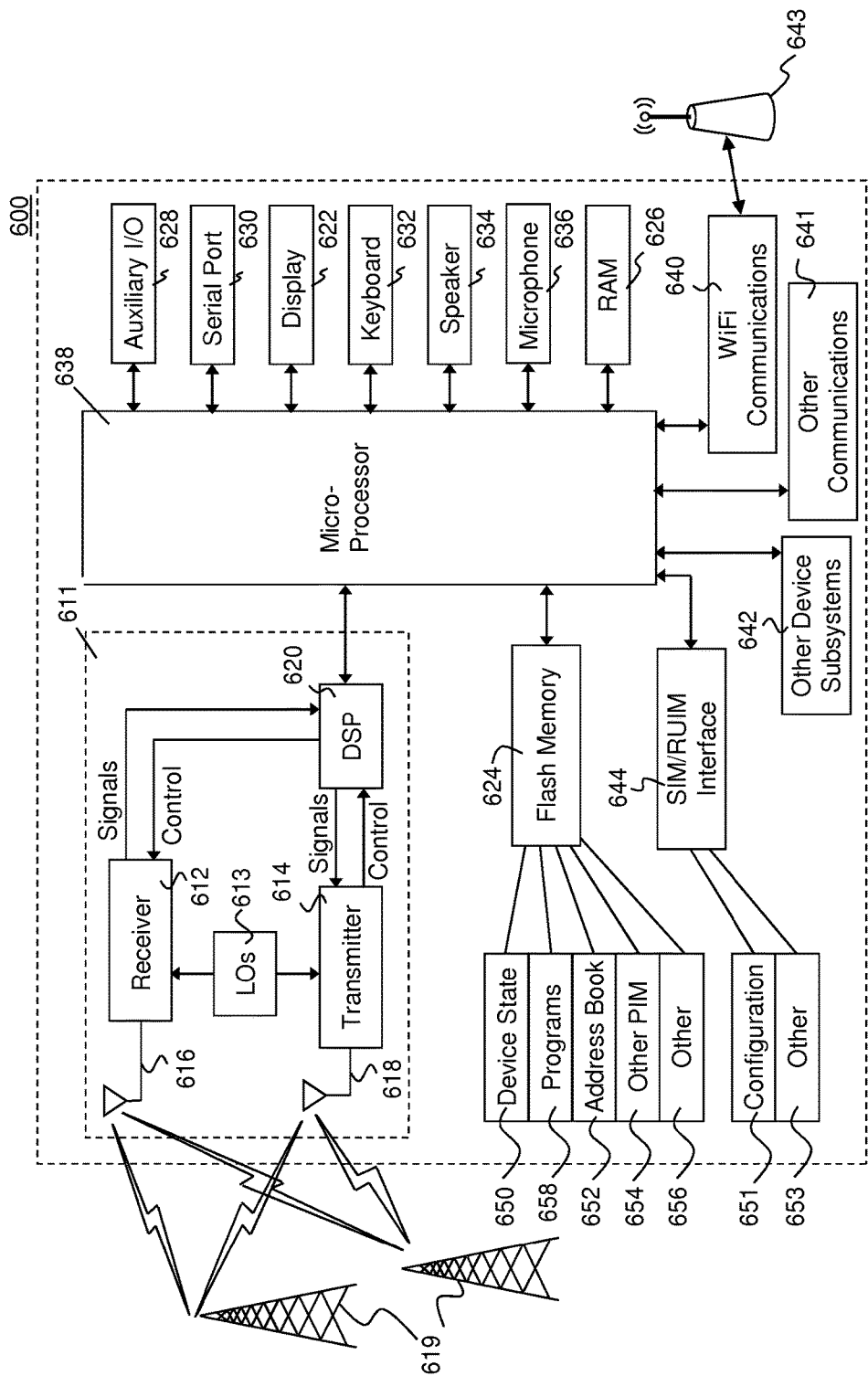
FIG. 6 is a block diagram of an exemplary user equipment capable of being used with the embodiments of the present disclosure.

When required network registration or activation procedures have been completed, UE 600 may send and receive communication signals over the network 619. As illustrated in FIG. 6, network 619 can comprise of multiple base stations communicating with the UE.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Network access requirements will also vary depending upon the type of network 619. In some networks network access is associated with a subscriber or user of UE 600. A UE may require a removable user identity module (RUIM) or a subscriber identity module (SIM) card in order to operate on a network. The SIM/RUIM interface 644 is normally similar to a card-slot into which a SIM/RUIM card can be inserted and ejected. The SIM/RUIM card hold many key configurations 651, and other information 653 such as identification, and subscriber related information.

UE 600 includes a processor 638 which controls the overall operation of the device. Communication functions, including at least data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 can be stored in a persistent store such as flash memory 624, which may instead be a read-only memory (ROM) or similar storage element (not shown). Specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate each program can allocate a portion of flash memory 624 for their own data storage requirements. Processor 638, in addition to its operating system functions, can enable execution of software applications on the UE. A predetermined set of applications which control basic operations, including at least data and voice communication applications for example, will normally be installed on UE 600 during manufacturing. Other applications could be installed subsequently or dynamically.

A software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application can have the ability to send and receive data items, via the wireless network 619. In an embodiment, the PIM data items are seamlessly integrated, synchronized and updated, via the wireless network 619, with the UE user's corresponding data items stored or associated with a host computer system. Further applications may also be loaded onto the UE 600 through the network 619, an auxiliary I/O subsystem 628, serial port 630, short-range communications subsystem 640 or any other suitable subsystem 642, and installed by a user in the RAM 626 or a non-volatile store (not shown) for execution by the microprocessor 638. Such flexibility in application installation increases the functionality of the device and may provide enhanced on-device functions, communication-related functions, or both.

In a data communication mode, a received signal such as a text message or web page download will be processed by the communication subsystem 611 and input to the microprocessor 638, which further processes the received signal for element attributes for output to the display 622, or alternatively to an auxiliary I/O device 628.

A user of UE 600 may also compose data items such as email messages for example, using the keyboard 632, which can be a complete alphanumeric keyboard or telephone-type keypad, in conjunction with the display 622 and possibly an auxiliary I/O device 628. Such composed items may then be transmitted over a communication network through the communication subsystem 611.

For voice communications, overall operation of UE 600 is similar, except that received signals would be output to a speaker 634 and signals for transmission would be generated by a microphone 636. Alternative voice or audio I/O subsystems, such as a voice message recording subsystem, may also be implemented on UE 600. Although voice or audio signal output is accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type UE for which synchronization with a user's desktop computer (not shown) may be desirable, but is an optional device component. Such a port 630 would enable a user to set preferences through an external device or software application and would extend the capabilities of UE 600 by providing for information or software downloads to UE 600 other than through a wireless communication network. The alternate download path may for example be used to load an encryption key onto the device through a direct and thus reliable and trusted connection to thereby enable secure device communication. Serial port 630 can further be used to connect the UE to a computer to act as a modem.

WiFi Communications Subsystem 640 is used for WiFi Communications and can provide for communication with access point 640.

Other communications subsystem(s) 641, such as a short-range communications subsystem, are further components that may provide for communication between UE 600 and different systems or devices, which need not necessarily be similar devices. For example, the subsystem(s) 141 may include an infrared device and associated circuits and components or a Bluetooth™ communication module to provide for communication with similarly enabled systems and devices.

Figure 7:
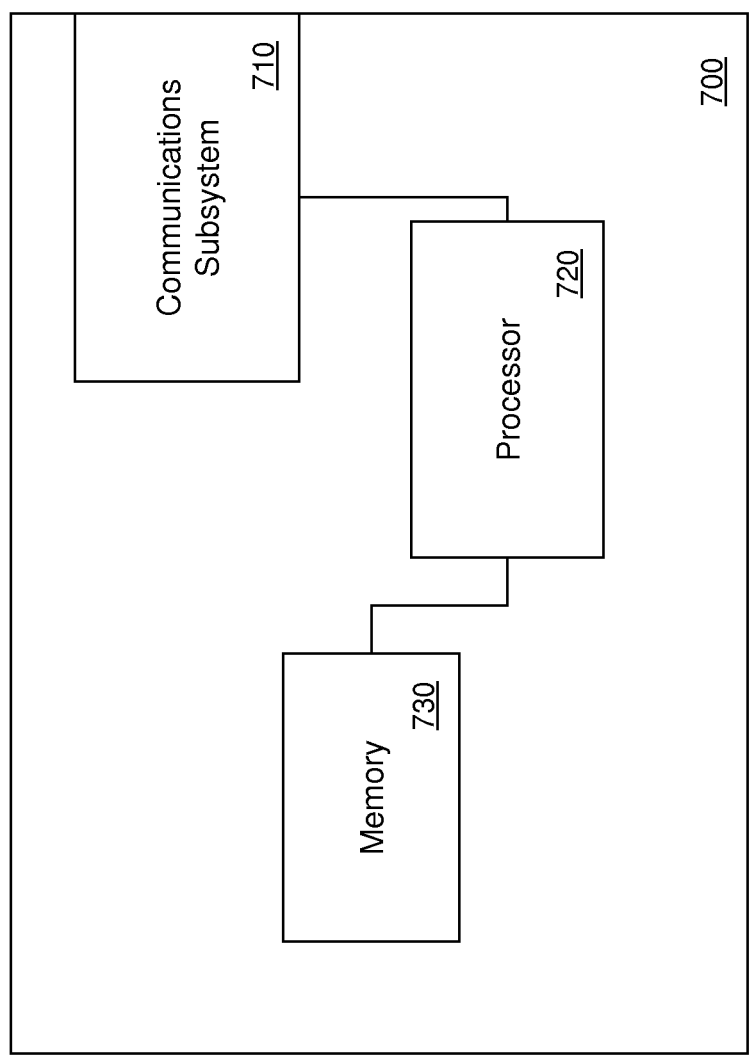
FIG. 7 is a simplified block diagram of an exemplary network node.

A simplified network node 700 is illustrated with regard to FIG. 7. In the embodiment of FIG. 7, a communications subsystem 710 is configured to communicate with other network elements and with UEs, for example through base stations.

A processor 720 communicates with communications subsystem 710 and is configured to perform the processes of, for example, FIGS. 3 and 5, among others.

A memory 730 is configured to store information at the network node 800 and can be accessed by processor 720.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

I claim:

1. A method, at a network node, for High Speed Downlink Packet Access ("HSDPA") de-activation, comprising:
   determining whether a number of serving HSDPA cell changes of a user equipment ("UE") communicating with the network node exceeds a threshold within a first time period;
   deactivating HSDPA for the UE if the threshold is exceeded within the first time period, wherein deactivating HSDPA comprises deallocating HSDPA resources from the UE such that the UE no longer has HSDPA resources assigned thereto; and
   after a second time period, activating HSDPA for the UE.

2. The method of claim 1, wherein the network node is a Radio Network Controller ("RNC").

3. The method of claim 1, wherein the threshold is one of a constant, a value received from a carrier, and a value received from a network operator.

4. The method of claim 1, further comprising, after the deactivation of the HSDPA:
   finding whether a number of serving HSDPA cell changes for the UE is below a second threshold for the second time period; and
   activating HDSPA for the UE only if the number of serving HSDPA cell changes for the UE during the second time period is below the second threshold.

5. The method of claim 1, wherein the second time period is one of a constant, a parameter signaled by the network, a function of network characteristics, and a function of HSDPA, cell change frequency.

6. The method of claim 1, wherein the determining comprises counting a number of MAC-HS RESET indications.

7. The method of claim 1, further comprising reactivating HSDPA for the UE based on at least one of network traffic, network load, and an amount of data intended for the UE.

8. A network element adapted for High Speed Downlink Packet Access (HSDPA) activation and de-activation, comprising:
   a processor; and
   a communication subsystem;
   wherein the processor and the communication subsystem cooperate to:
      determine whether a number of serving HSDPA cell changes of a user equipment ("UE") communicating with the network node exceeds a threshold within a first time period; and;
      deactivate HSDPA for the UE if the threshold is exceeded within the first time period, wherein deactivating HSDPA comprises deallocating HSDPA resources from the UE such that the UE no longer has HSDPA resources assigned thereto; and
      after a second time period, activate HSDPA for the UE.

9. The network element of claim 8, wherein the network node is a Radio Network Controller ("RNC").

10. The network element of claim 8, wherein the threshold is one of a constant, a value received from a carrier, and a value received from a network operator.

11. The network element of claim 8, wherein after the deactivation of the HISDPA, the processor and the communication subsystem further cooperate to:
   find whether a number of serving HSDPA cell changes for the UE is below a second threshold for the second time period;
   activate HDSPA for the UE only if the number of serving HSDPA cell changes for the UE during the second time period is below the second threshold.

12. The network element of claim 8, wherein the second time period is one of a constant, a parameter signaled by the network, a function of network characteristics, and a function of HSDPA cell change frequency.

13. The network element of claim 8, wherein the determining comprises counting a number of MAC-HS RESET indications.

14. The network element of claim 8, wherein the processor and the communication subsystem further cooperate to deactivate HSDPA for the UE based on at least one of network traffic, network load, and an amount of data intended for the UE.

* * * * *

UNITED STATES PATENT AND TRADEMARK OFFICE
CERTIFICATE OF CORRECTION

PATENT NO. : 9,867,229 B2
APPLICATION NO. : 14/750544
DATED : January 9, 2018
INVENTOR(S) : Ozgur Ekici Page 1 of 1

It is certified that error appears in the above-identified patent and that said Letters Patent is hereby corrected as shown below:

In the Claims

- In Claim 4, Column 11, Line 46, change "HDSPA" to read "HSDPA".

- In Claim 5, Column 11, Line 52, delete the "," between the words "HSDPA" and "cell".

- In Claim 8, Column 12, Line 18, delete the ";" after the word "and".

- In Claim 11, Column 12, Line 31, change "HISDPA" to read "HSDPA".

- In Claim 11, Column 12, Line 36, change "HDSPA" to read "HSDPA".

Signed and Sealed this
Eighth Day of May, 2018

Andrei Iancu
*Director of the United States Patent and Trademark Office*